United States Patent
Barnes et al.

(10) Patent No.: US 10,664,851 B1
(45) Date of Patent: May 26, 2020

(54) BEHAVIORAL ANALYSIS ENGINE FOR PROFILING WIRELESS SUBSCRIBERS

(71) Applicant: Sprint Communications Company L.P., Overland Park, KS (US)

(72) Inventors: James D. Barnes, Overland Park, KS (US); Devon Biere, Olathe, KS (US); Dora Potluri, Plano, TX (US); Sanjay Sharma, Olathe, KS (US); Lavanya Srinivasan, Flower Mound, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 248 days.

(21) Appl. No.: 15/227,950

(22) Filed: Aug. 3, 2016

Related U.S. Application Data (63) Continuation of application No. 11/557,939, filed on Nov. 8, 2006, now abandoned.

(51) Int. Cl.
*G06Q 30/02* (2012.01)
*H04L 12/14* (2006.01)
*H04L 29/08* (2006.01)

(52) U.S. Cl.
CPC ......... *G06Q 30/02* (2013.01); *G06Q 30/0255* (2013.01); *G06Q 30/0267* (2013.01); *G06Q 30/0269* (2013.01); *H04L 12/14* (2013.01); *H04L 67/02* (2013.01); *H04L 67/04* (2013.01); *H04L 67/22* (2013.01); *H04L 67/306* (2013.01)

(58) Field of Classification Search
CPC ............... G06Q 30/02; G06Q 30/0255; G06Q 30/0267; G06Q 30/0269; G06Q 30/0201; G06Q 10/067; G06Q 30/0204
See application file for complete search history.

(56) References Cited

U.S. PATENT DOCUMENTS

| | | |
|---|---|---|
| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |
| 5,933,811 A | 8/1999 | Angles et al. |

(Continued)

FOREIGN PATENT DOCUMENTS

| | | |
|---|---|---|
| JP | 2002041944 A | 2/2002 |
| JP | 2002185613 A | 6/2002 |

(Continued)

OTHER PUBLICATIONS

FAIPP Office Action dated Dec. 4, 2017, U.S. Appl. No. 14/619,689, filed Feb. 11, 2015.

(Continued)

*Primary Examiner* — Stephanie Z Delich (57) ABSTRACT

A method and system are disclosed for behavioral analysis for profiling wireless subscribers. The method includes loading carrier reference data comprising a set of common categories and loading a plurality of behavior records of at least two types, wherein each behavior record is generated by a mobile device activity of a subscriber. The method proceeds by associating each behavior record with one or more of the categories, thereby generating categorized data records. Finally each category associated with a behavior record is added to a subscriber profile for the subscriber whose activity generated the behavior record.

20 Claims, 5 Drawing Sheets

(56) References Cited

U.S. PATENT DOCUMENTS

| | | |
|---|---|---|
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,328,169 B2 | 2/2008 | Temares et al. |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,788,644 B2 | 8/2010 | Koduru et al. |
| 7,801,518 B1 | 9/2010 | Urbanek |
| 7,801,843 B2 | 9/2010 | Kumar et al. |
| 7,840,498 B2 | 11/2010 | Frank et al. |
| 7,958,005 B2 | 6/2011 | Dangaltchev |
| 7,974,616 B1 | 7/2011 | Urbanek |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,509,821 B1 | 8/2013 | Zang et al. |
| 8,650,184 B2 | 2/2014 | Kowalchuk et al. |
| 9,275,390 B1 | 3/2016 | Barnes et al. |
| 9,319,379 B1 | 4/2016 | Burcham et al. |
| 9,374,335 B2 | 6/2016 | Burcham et al. |
| 9,508,090 B1 | 11/2016 | Belser et al. |
| 9,590,938 B1 | 3/2017 | Burcham et al. |
| 9,734,515 B1 | 8/2017 | Belser et al. |
| 10,068,261 B1 | 9/2018 | Barnes et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0080772 A1 | 4/2005 | Bern |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0177449 A1 | 8/2005 | Temares et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0254712 A1 | 11/2005 | Lindeman |
| 2005/0256759 A1 | 11/2005 | Acharya et al. |
| 2005/0278296 A1 | 12/2005 | Bostwick |
| 2006/0026060 A1 | 2/2006 | Collins |
| 2006/0056433 A1 | 3/2006 | Herrmann |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0173556 A1 | 8/2006 | Rosenberg |
| 2006/0178932 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2006/0282316 A1 | 12/2006 | Snyder et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0010137 A1 | 1/2008 | Ho et al. |
| 2008/0045245 A1 | 2/2008 | Billmaier et al. |
| 2008/0065476 A1 | 3/2008 | Klein et al. |
| 2008/0082412 A1 | 4/2008 | Tallyn et al. |
| 2008/0090599 A1 | 4/2008 | Patel et al. |
| 2008/0097851 A1 | 4/2008 | Bemmel et al. |
| 2008/0098420 A1 | 4/2008 | Khivesara et al. |
| 2008/0104637 A1 | 5/2008 | Rodriguez et al. |
| 2008/0126515 A1 | 5/2008 | Chambers et al. |
| 2008/0140476 A1 | 6/2008 | Anand et al. |
| 2008/0147478 A1 | 6/2008 | Mall et al. |
| 2008/0228583 A1 | 9/2008 | MacDonald et al. |

(56) References Cited

U.S. PATENT DOCUMENTS

| | | |
|---|---|---|
| 2009/0013051 A1 | 1/2009 | Renschler et al. |
| 2009/0029721 A1 | 1/2009 | Doraswamy |
| 2009/0030802 A1 | 1/2009 | Plotnick et al. |
| 2009/0048977 A1 | 2/2009 | Aggarwal et al. |
| 2009/0070129 A1 | 3/2009 | Inbar et al. |
| 2009/0144139 A1 | 6/2009 | Gaedcke |
| 2009/0150215 A1 | 6/2009 | Kalb et al. |
| 2009/0157512 A1 | 6/2009 | King |
| 2009/0198580 A1 | 8/2009 | Kamangar |
| 2009/0216683 A1 | 8/2009 | Gutierrez |
| 2009/0222329 A1 | 9/2009 | Ramer et al. |
| 2009/0265245 A1 | 10/2009 | Wright |
| 2009/0271255 A1 | 10/2009 | Utter et al. |
| 2009/0292608 A1 | 11/2009 | Polachek |
| 2010/0082422 A1 | 4/2010 | Heilig et al. |
| 2010/0082429 A1 | 4/2010 | Samdadiya et al. |
| 2010/0222035 A1 | 9/2010 | Robertson et al. |
| 2011/0022447 A1 | 1/2011 | Pelaic |
| 2011/0082939 A1 | 4/2011 | Montemurro et al. |
| 2011/0106622 A1 | 5/2011 | Kuhlman et al. |
| 2011/0131109 A1 | 6/2011 | Pappas et al. |
| 2011/0246890 A1 | 10/2011 | Mellamphy et al. |
| 2011/0258049 A1 | 10/2011 | Ramer et al. |
| 2011/0270687 A1 | 11/2011 | Bazaz |
| 2011/0321167 A1 | 12/2011 | Wu et al. |
| 2012/0072271 A1 | 3/2012 | Dessert et al. |
| 2012/0123830 A1 | 5/2012 | Svendsen et al. |
| 2012/0123862 A1 | 5/2012 | Kurra et al. |
| 2012/0170521 A1 | 7/2012 | Vogedes et al. |
| 2012/0179536 A1 | 7/2012 | Kalb et al. |
| 2013/0006743 A1 | 1/2013 | Moore et al. |
| 2013/0018714 A1 | 1/2013 | George |
| 2013/0115872 A1 | 5/2013 | Huang et al. |
| 2013/0138506 A1 | 5/2013 | Zhu et al. |
| 2013/0211925 A1 | 8/2013 | Holland |
| 2013/0211941 A1 | 8/2013 | Hallowell et al. |
| 2013/0304586 A1 | 11/2013 | Angles et al. |
| 2013/0331027 A1 | 12/2013 | Rose et al. |
| 2014/0006129 A1 | 1/2014 | Heath |
| 2014/0052536 A1 | 2/2014 | McAndrew et al. |
| 2014/0066029 A1 | 3/2014 | Brennan et al. |
| 2014/0080467 A1 | 3/2014 | Urbanek |
| 2014/0222569 A1 | 8/2014 | Kerr |
| 2014/0235265 A1 | 8/2014 | Slupik |
| 2014/0274031 A1 | 9/2014 | Menendez |
| 2014/0278953 A1 | 9/2014 | Ismail et al. |
| 2015/0208199 A1 | 7/2015 | Li et al. |
| 2015/0249914 A1 | 9/2015 | Yu et al. |

FOREIGN PATENT DOCUMENTS

| | | |
|---|---|---|
| WO | WO03044703 A1 | 5/2003 |
| WO | WO2015038562 A1 | 3/2015 |

OTHER PUBLICATIONS

Final Office Action dated Dec. 15, 2017, U.S. Appl. No. 14/532,969, filed Nov. 4, 2014.
Final Office Action dated Jan. 18, 2018, U.S. Appl. No. 11/558,021, filed Nov. 9, 2006.
Advisory Action dated Jan. 24, 2018, U.S. Appl. No. 14/532,969, filed Nov. 4, 2014.
Notice of Panel Decision From Pre-Appeal Brief Review dated May 15, 2018, U.S. Appl. No. 11/558,021, filed Nov. 9, 2006.
Notice of Allowance dated May 18, 2018, U.S. Appl. No. 11/558,021, filed Nov. 9, 2006.
Office Action dated Jul. 10, 2017, U.S. Appl. No. 14/250,381, filed Apr. 10, 2016.
Final Office Action dated Mar. 27, 2018, U.S. Appl. No. 14/250,381, filed Apr. 10, 2016.
Final Office Action dated Mar. 12, 2018, U.S. Appl. No. 14/619,689, filed Feb. 11, 2015.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer dated Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action dated Aug. 5, 2014, U.S. Appl. No. 11/557,939, filed Nov. 8, 2006.
Final Office Action dated Mar. 2, 2015, U.S. Appl. No. 11/557,939, filed Nov. 8, 2006.
Advisory Action dated May 18, 2015, U.S. Appl. No. 11/557,939, filed Nov. 8, 2006.
Office Action dated Dec. 17, 2015, U.S. Appl. No. 11/557,939, filed Nov. 8, 2006.
Final Office Action dated May 3, 2016, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Examinees Answer dated Mar. 12, 2015, U.S. Appl. No. 12/259,187, filed Oct. 27, 2008.
Restriction Requirement dated May 19, 2016, U.S. Appl. No. 14/024,627, filed Sep. 11, 2013.
FAIPP Pre-Interview Communication dated Sep. 9, 2016, U.S. Appl. No. 14/024,627, filed Sep. 11, 2013.
Notice of Allowance dated Oct. 24, 2016, U.S. Appl. No. 14/024,627, filed Sep. 11, 2013.
FAIPP Pre-Interview Communication dated Nov. 18, 2015, U.S. Appl. No. 14/024,629, filed Sep. 11, 2013.
Notice of Allowance dated Jan. 28, 2016, U.S. Appl. No. 14/024,629, filed Sep. 11, 2013.

(56) References Cited

OTHER PUBLICATIONS

FAIPP Pre-Interview Communication dated Sep. 23, 2015, U.S. Appl. No. 13/956,367, filed Aug. 1, 2013.
Notice of Allowance dated Dec. 16, 2015, U.S. Appl. No. 13/956,367, filed Aug. 1, 2013.
FAIPP Pre-Interview Communication dated Apr. 3, 2015, U.S. Appl. No. 14/150,832, filed Jan. 9, 2014.
FAIPP Office Action dated Jul. 2, 2015, U.S. Appl. No. 14/150,832, filed Jan. 9, 2014.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
Office Action dated May 17, 2016, U.S. Appl. No. 14/150,832, filed Jan. 9, 2014.
Final Office Action dated Oct. 14, 2016, U.S. Appl. No. 14/150,832, filed Jan. 9, 2014.
FAIPP Pre-Interview Communication dated Sep. 18, 2015, U.S. Appl. No. 14/494,601, filed Sep. 24, 2014.
First Action Interview Office Action dated Dec. 17, 2015, U.S. Appl. No. 14/494,601, filed Sep. 24, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Office Action—Restriction requirement dated Jun. 17, 2008, U.S. Appl. No. 11/405,195, filed Apr. 17, 2006, 7 pages.
Office Action dated Aug. 15, 2008, U.S. Appl. No. 11/405,195, filed Apr. 17 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.

Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated 10/27/11, U.S. Appl. No. 11/438,540, filed May 22, 2006.
Decision on Appeal dated Apr. 28, 2015, U.S. Appl. No. 11/438,540, filed May 22, 2006.
Notice of Allowance dated Jul. 16, 2015, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 25, 2015, U.S. Appl. No. 11/474,880, filed Jun. 26, 2006.
Final Office Action dated Aug. 31, 2015, U.S. Appl. No. 11/474,880, filed Jun. 26, 2006.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Examiner's Answer dated Nov. 2, 2016, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Dec. 27, 2016, U.S. Appl. No. 14/150,832, filed Jan. 9, 2014.
Office Action dated Jul. 7, 2017, U.S. Appl. No. 11/558,021, filed Nov. 9, 2006.
Office Action dated Jul. 10, 2017, U.S. Appl. No. 11/403,614, filed Apr. 13, 2006.
FAIPP Office Action dated Jul. 19, 2017, U.S. Appl. No. 14/532,969, filed Nov. 4, 2014.
FAIPP Pre-Interview Communication dated Oct. 4, 2017, U.S. Appl. No. 14/619,689, filed Feb. 11, 2015.
Fisher, Marshall, et al., Accurate Retail Testing of Fashion Merchandise: Methodology and Application, Marketing Science, vol. 19, No. 3, pp. 266-278, Summer 2000, ABI/INFORM Global.

(56) References Cited

OTHER PUBLICATIONS

Kurawarwala, Abbas A., et al., "Forecasting and Inventory Management of Short Life-Cycle Products", Operations Research, vol. 44, No. 1, Jan.-Feb. 1996, pp. 131-150, INFORMS.

Stratman, Scott, "Allstockedup", Industrial Distribution, vol. 89, No. 11, Nov. 2000, pp. 92-96, ABI/INFORM Global.

Vijayan, Jaikumar, "IBM Service Follows Products After Delivery", Computerworld, vol. 35, No. 28, p. 14, Jul. 3, 2001, ABI/INFORM Global.

Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.

Janssen, Cory, "Identifier for Advertisers (IFA)," http://www.techopedia.com/definition/29032/identifier-for-advertisers-ifa-ifda, Apr. 3, 2014, last accessed Feb. 10, 2015.

The iPhone Wiki, "Udid," http://theiphonewiki.com/wiki/UDID, Apr. 3, 2014, last accessed Feb. 10, 2015.

Google Developer Android, "Advertising ID," http://developer.android.com/google/play-services/id.html, Apr. 3, 2014, last accessed Feb. 10, 2015.

Wikipedia, "Real-time Bidding," http://en.wikipedia.org/wiki/Real-time_bidding, Apr. 3, 2014, last accessed Feb. 10, 2015.

Reynolds, Kevin, Are Ad Exchanges and Real Time Bidding the Next Big Thing?, 'http://www.advertisingperspectives.com/adblog/media-activation/are-ad-exchanges-and-real-time-bidding-the-next-big-thing/, Apr. 3, 2014, last accessed Feb. 10, 2015.

Foreign Communication from a Related Counterpart—International Search Report and Written Opinion, dated Dec. 24, 2014, PCT/US14/54877, filed Nov. 11, 2014.

Foreign Communication from a Related Counterpart—Preliminary Report on Patentability dated Mar. 24, 2016, PCT/US14/54877, filed Sep. 10, 2014.

Thierer, et al., "Privacy Solutions (Part 2): Adblock Plus," Technology Liberation Front, Sep. 8, 2008, on line at techliberation.com.

Wikipedia, "Foursuare," https://en.wikipedia.org/w/index.php?title=Foursquare&oldid=681836736, Mar. 2009, last accessed on Sep. 25, 2015.

Barnes, James D., et al., entitled, "In-Flight Campaign Optimization," filed Nov. 9, 2006, U.S. Appl. No. 11/558,021.

Barnes, James D., et al., entitled "Seamless Retrieval of Non-Standard Items for a Mobile Device," filed May 12, 2006, U.S. Appl. No. 11/433,301.

Barnes, James D., et al., entitled "Seamless Retrieval of Non-Standard Items for a Mobile Device," filed Jan. 12, 2010, U.S. Appl. No. 12/686,188.

Barnes, James D., et al., entitled "Mobile-Device-Based Coupon Management Systems and Methods," filed Apr. 13, 2006, U.S. Appl. No. 11/403,614.

Barnes, James D., et al., entitled, "Inventory Management Integrating Subscriber and Targeting Data," filed Jun. 26, 2006, U.S. Appl. No. 11/474,880.

Barnes, James D., et al., entitled, "Behavioral Analysis Engine for Profiling Wireless Subscribers," filed Nov. 8, 2006, U.S. Appl. No. 11/557,939.

Barnes, James D., et al., entitled, "Advertisement Inventory Management," filed Oct. 27, 2008, U.S. Appl. No. 12/259,187.

Martin, Geoff S., et al., entitled, "Method and System for Providing Custom Background-Downloads," filed Nov. 16, 2007, U.S. Appl. No. 11/280,576.

McConnell, Von K. et al., entitled, "Method and System Using Location History for Targeted Coupon Distribution," filed May 17, 2000, U.S. Appl. No. 09/572,282.

Weaver, Farni, et al., "Method and System for Facilitating Determination of Call-Drop Locations in a Wireless Network," filed Sep. 9, 2003, U.S. Appl. No. 10/658,353.

Burcham, Robert H., et al., entitled "System and Method for Identifying a Mobile Device with Near Real Time Visualization to Action," filed Sep. 11, 2013, U.S. Appl. No. 14/024,627.

Belser, John E., et al., entitled "Ad Management Using Ads Cached on a Mobile Electronic Device," filed Jan. 9, 2014, U.S. Appl. No. 14/150,832.

Katzer, Robin D., et al., entitled "Advertisement Dynamic Queue Management," filed Apr. 10, 2014, U.S. Appl. No. 14/250,381.

Belser, John E, et al., entitled "End User Participation in Mobile Advertisement,"filed Sep. 24, 2014, U.S. Appl. No. 14/494,601.

Burcham, Robert H., et al., entitled "Categorization of Unknown Variables in a Target Information Database," filed Nov. 4, 2014, U.S. Appl. No. 14/532,969.

Ferrante, Piero D., et al., entitled, "System and Method for Subscriber Cluster Synthesis," filed Feb. 11, 2015, U.S. Appl. No. 14/619,689.

Decision on Appeal dated Apr. 14, 2017, U.S. Appl. No. 12/259,187, filed Oct. 27, 2008.

Notice of Allowance dated Apr. 3, 2017, U.S. Appl. No. 14/150,832, filed Jan. 9, 2014.

FAIPP Pre-Interview Communication dated May 9, 2017, U.S. Appl. No. 14/532,969, filed Nov. 4, 2014

Advisory Action dated Jul. 2, 2018, U.S. Appl. No. 14/250,381, filed Apr. 10, 2014.

Examiner's Answer dated Jul. 27, 2018, U.S. Appl. No. 14/532,969, filed Nov. 4, 2014.

Office Action dated Jun. 28, 2018, U.S. Appl. No. 14/619,689, filed Feb. 11, 2015.

Japanese Office Action dated Aug. 7, 2018, JP Application Serial No. 2016-542051, filed on Jan. 26, 2016.

Final Office Action dated Nov. 8, 2018, U.S. Appl. No. 14/619,689, filed Feb. 11, 2015.

Decision on Appeal dated Mar. 20, 2019, U.S. Appl. No. 11/474,880, filed Jun. 26, 2006.

Office Action dated Feb. 7, 2019, U.S. Appl. No. 14/250,381, filed Apr. 10, 2014.

Advisory Action dated Feb. 19, 2019, U.S. Appl. No. 14/619,689, filed Feb. 11, 2015.

Notice of Panel Decision dated Apr. 5, 2019, U.S. Appl. No. 14/619,689, filed Feb. 11, 2015.

BEHAVIORAL ANALYSIS ENGINE FOR PROFILING WIRELESS SUBSCRIBERS

CROSS-REFERENCE TO RELATED APPLICATIONS

This application includes subject matter related to the following application, which is hereby incorporated by reference: U.S. patent application Ser. No. 11/474,880, filed Jun. 26, 2006, entitled "Inventory Management Integrating Subscriber and Targeting Data," by James Barnes, et al. This application is a continuation of and claims priority under 35 U.S.C. § 120 to U.S. patent application Ser. No. 11/557,939, filed on Nov. 8, 2006, entitled "Behavioral Analysis Engine for Profiling Wireless Subscribers", by James Barnes, et al., which is incorporated herein by reference in its entirety for all purposes.

BACKGROUND

Mobile communication devices, such as cellular telephones, communicate through networks provided by a carrier. Through the networks, the mobile communications devices are able to obtain content from various content providers. For example, users of cellular telephones can download audio clips (e.g., songs) to be played through the phone as a ringer. Other content can be similarly obtained, including games, software utilities, and images that serve as a background on the telephone's display. Various services can also be accessed, including text messaging, email services, news alerts, etc. Additionally, through the networks, users of mobile communications are able to access the Internet with Wireless Application Protocol ("WAP") requests. Providers of such content, services, and websites naturally desire to provide content or services that their subscribers prefer. Details regarding web usage may provide insight into the subscriber, including for example, the sites visited, dates and time visited, and the like. There is, however, an unmet need to understand individual subscribers and differentiate them from one another.

SUMMARY

One illustrative method for behavior profiling of wireless subscribers can include loading carrier reference data comprising a set of common categories and loading a plurality of behavior records of at least two types, wherein each behavior record is generated by a mobile device activity of a subscriber. The method can also include associating each behavior record with one or more of the categories, thereby generating categorized data records. Finally each category associated with a behavior record is added to a subscriber profile for the subscriber whose activity generated the behavior record.

An alternative method for behavior profiling of wireless subscribers can include loading carrier reference data comprising a set of common categories. The method can also include loading a plurality of behavior records of at least two types of behavior, wherein each behavior record is generated by a mobile device activity of a subscriber. Additionally, the method can include identifying one or more keywords in a URL for a mobile web request behavior record, looking up a keyword association for the identified keywords to identify a category, and associating the category with the mobile request behavior record, thereby generating a categorized data record. The method may also include extracting from the behavior record an identity of a content purchase item for a content purchase, looking up at least one associated category for the content purchase item in a catalog, and associating the category with the content purchase behavior record, thereby generating a categorized data record. Each category associated with a behavior record to a subscriber profile may be added for the subscriber whose activity generated the behavior record, thereby tracking mobile web requests and content purchases according to the set of common categories.

An illustrative carrier system for behavior profiling of wireless subscribers can include a plurality of data sources that store raw behavior data records wherein each behavior record is generated by a mobile device activity of a subscriber. The carrier system can also include a behavioral engine that obtains carrier reference data comprising a set of common categories and obtains from the data sources a plurality of records of at least two types of behavior, wherein each behavior record is generated by a mobile device activity of a subscriber. The behavioral engine can also associate each behavior record with one or more of the categories, thereby generating categorized data records. Additionally, the behavioral engine may add each category associated with a behavior record to a subscriber profile for the subscriber whose activity generated the behavior record.

An illustrative computer-readable medium storing a software program that, when executed by a computer processor, can cause the processor to load carrier reference data comprising a set of common categories. The software program can additionally cause the processor to load a plurality of behavior records of at least two types of behavior, wherein each behavior record is generated by a mobile device activity of a subscriber. The software program can also cause the processor to associate each behavior record with one or more of the categories, thereby generating categorized data records. Still further, the software program can cause the processor to add each category associated with a behavior record to a subscriber profile for the subscriber whose activity generated the behavior record, and store the categorized data records. The software program can also cause the processor to apply a first business rule by a first carrier business group to the categorized data records to reach a first conclusion, and applying a second business rule by a second carrier business group the categorized data records to reach a second conclusion, enabled by the set of common categories.

An alternative illustrative computer-readable medium storing a software program that, when executed by a computer processor, can cause the processor to load carrier reference data comprising a set of common categories. The software program can additionally cause the processor to load a plurality of behavior records of at least two types of behavior, wherein each behavior record is generated by a mobile device activity of a subscriber. For a mobile web request behavior record, the software program can additionally cause the processor to identify one or more keywords in a URL, look up a keyword association for the identified keywords to identify a category, and associate the category with the mobile request behavior record, thereby generate a categorized data record. For a content purchase, the software program can additionally cause the processor to extract from the behavior record an identity of a content purchase item, look up at least one associated category for the content purchase item in a catalog, and associate the category with the content purchase behavior record, thereby generate a categorized data record. The software program can also cause the processor to add each category associated with a behavior record to a subscriber profile for the subscriber whose activity generated the behavior record, thereby tracking mobile web requests and content purchases according to the set of common categories.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present invention is illustrated below, the present system may be implemented using any number of techniques, whether currently known or in existence. The present disclosure should in no way be limited to the implementations, drawings, and techniques illustrated below, but may be modified as desired and as would be understood by one of ordinary skill in the art.

Carriers that provide network services to mobile communication devices are in a unique position to gather vast quantities of information pertaining to their subscribers as well as the mobile devices used by the subscribers. The present disclosure discloses various systems and methods for collecting, processing, and analyzing subscriber data in order to better understand the interests and characteristics of subscribers at both the individual level and the aggregate level. Subscriber profiles may be built and maintained by associating each subscriber's mobile web browsing, content purchases, demographic, and other subscriber data with behavioral categories. Different groups within the carrier enterprise may apply business rules to the categorized data to accomplish different purposes, such as marketing, customer service, new product development, and the like.

The behavioral engine of the present disclosure focuses on the activities and behavior of individual subscribers, whereas existing web usage tracking products provide aggregate reporting at the web site or product level, not the subscriber and transaction level. The behavioral engine makes use of the fact that the carrier can precisely track its subscribers' mobile web and download activities end to end, as compared to traditional web traffic analysis tools, which can only track a portion of the entire online experience.

Specially, the behavioral engine of the present disclosure combines data from various sources of different types of data, such as subscriber billing information, mobile web requests, and premium content purchases, into a common behavioral analysis framework that may be used by different groups within the enterprise for different purposes. The behavioral engine enables detailed tracking of a subscriber's behavior by date, content type (ringer, game, web, etc.), category (news, sports, music, etc.), and multiple combinations of the same.

The behavioral engine collects, categorizes, and summarizes behavioral events for each subscriber, and then relies on business rules to determine whether a subscriber should be considered active or inactive for a particular category. This categorization followed by application of business rules creates a robust and flexible approach to making decisions about what each event means in business terms.

The behavioral engine enables different groups within the carrier enterprise to specify their own business rules that make use of the categorized data, thus reusing the same categorization logic and underlying data while reaching different scoring and activation conclusions per subscriber based on the unique requirements of the group. Specifically, the behavioral engine of the present disclosure is a standard subscriber data analysis engine that applies the same behavioral categories and processing rules across different content types, business units, legacy carriers, and subscriber segments.

Figure 1:
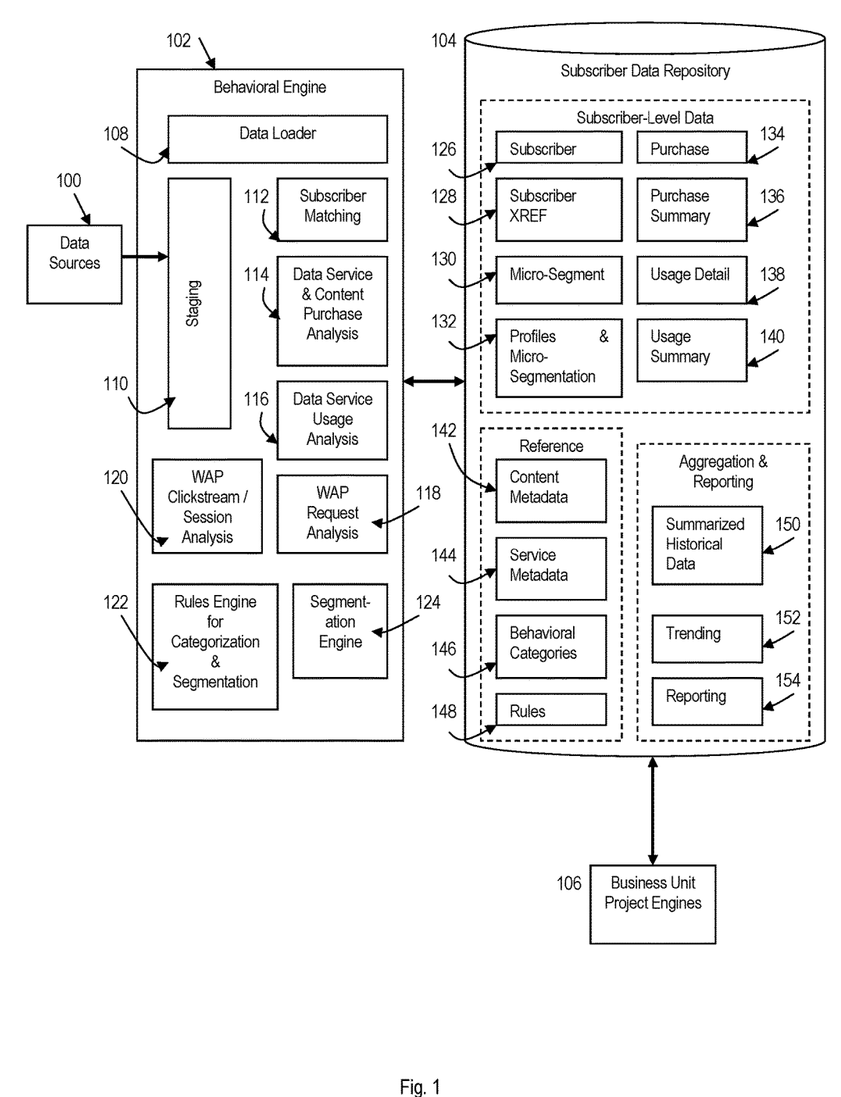
FIG. 1 is a block diagram of a carrier system with a behavioral engine in accordance with embodiments of the present disclosure.

Referring to FIG. 1, a block diagram is shown of an illustrative embodiment of the behavioral engine in the carrier system of the present disclosure. Various data sources 100 generating and storing various different types of data feed into the behavioral engine 102. The behavioral engine processes the data, as will be discussed in greater detail below, and delivers the processed data into the subscriber data repository 104. Various business unit project engines 106 may access the subscriber data repository to use the processed data according to various different business unit purposes.

Specifically, the behavioral engine 102 includes a data loader 108 that loads raw detailed data records from the data sources 100 into a staging area 110. From the staging area 110, the raw detailed data records may be processed sequentially in any order through the following processing engines within the behavioral engine 102. In the subscriber matching engine 112, the identity of a subscriber who carried out a particular event documented by a raw detailed data record is extracted and matched to the identity of a subscriber in the carrier reference source 258 (discussed with respect to FIG. 2 below). In the data service and content purchase usage analysis engine 114, the behavioral engine 102 extracts from the raw detailed data record the details about a purchase of premium content, such as for example a ringer, including the identity of the content purchased, and looks up in the data service & content purchases data source 240 (discussed below with respect to FIG. 2). The data retrieved based on the details is then used (i.e., by the Rules Engine for Categorization & Segmentation 122 and the Segmentation Engine 124) to determine which category or categories are associated with the particular content that was purchased in the purchase documented by the record.

In the data service usage analysis engine 116, the behavioral engine 102 extracts from the raw detailed data record the details about a use of purchased premium content, such as for example a ringer, including the identity of the content purchased and when and/or how it was used by the purchaser, and looks up in the data service usage data source 200 (discussed below with respect to FIG. 2). The data retrieved based on the details is then used (i.e., by the Rules Engine for Categorization & Segmentation 122 and the Segmentation Engine 124) to determine which category or categories are associated with the particular content that was used in the usage documented by the raw detailed data record.

In the WAP Request Analysis engine 118, the behavioral engine 102 extracts from the raw detailed data record the details about a mobile web request for a WAP page. Specifically, from the raw detailed data record, the WAP Request Analysis engine 118 extracts the WAP address, and by accessing the web keywords and categories data source 278 (to be discussed below with respect to FIG. 2), the WAP Request Analysis engine 118 associates a category or categories with the WAP request record based on the keyword associations. As referred to herein, a web keyword refers to a text pattern or regular expression that is matched against the URLs processed by the carrier. This may be a basic dictionary-style keyword (such as "sports") or a pattern with wildcard characters or other regular expression-type text elements (such as "*cnn.com/*sp247/*" where * is treated as zero to many characters).

In the WAP Clickstream/Session Analysis engine 120, the behavioral engine 102 extracts from the raw detailed data record the details about the sequence of links that the subscriber clicked on while browsing a website or series of websites in a session. From the raw detailed record, the WAP Clickstream/Session Analysis engine 120 extracts the WAP addresses, and by accessing the web keywords and categories data source 278 (to be discussed below with respect to FIG. 2), the WAP Clickstream/Session Analysis engine 120 associates a category or categories with the particular session based on the keyword associations.

The Rules Engine for Categorization & Segmentation 122 uses the extracted details and looked up details (looked up by the data service and content purchase usage analysis engine 114 and/or data service usage analysis engine 116 for example), to determine the categories into which any given subscriber falls, based on his or her behavioral events. The Rules Engine for Categorization & Segmentation 122 may determine that a subscriber is active or inactive for a given category or segment based on his or her recent activities. The determined categories may then be compiled by the Rules Engine for Categorization & Segmentation 122 into a subscriber profile for each subscriber, thereby summarizing the available raw data related to the subscriber into a useable profile based on the categories used across the enterprise. The subscriber profiles, including processed data, are then passed to the subscriber data repository 104.

The Segmentation Engine 124 uses subscriber profiles generated by the Rules Engine for Categorization & Segmentation 122 and divides the already categorized data (the subscriber profiles) into segments grouped for use by the business units, such as for use by advertisers in targeted campaigns. When subscriber profiles are segmented by the segmentation engine 124, the segments are then stored in the subscriber data repository 104. The segments categorize subscriber profiles into groups which may be used in carrying out campaigns by the various business groups, such as advertising for third parties, marketing a new internal product, or teaching subscribers in groups that under-utilize various functions of the mobile device how to make use of them.

As stated above, the behavioral engine passes processed data to be stored in the subscriber data repository 104. The subscriber data repository 104 may be divided into subscriber-level data, reference data, and aggregation and reporting data. The subscriber-level data may include the identity of the subscriber 126, the subscriber cross reference file 128 that associates the subscriber with related subscribers, for example, when the subscriber is on a friends and family plan, the identity of micro-segments 130 into which the particular subscriber falls, the subscriber profile and micro-segmentation 132 (generated by the behavioral engine), purchase detail 134 for a particular event, a purchase summary 136, usage detail 138 for a particular event, and a usage summary 140.

The reference data may include various data defined by the programmer, which may, in some embodiments, be subject to updates, changes and additions. The reference data may include content metadata 142, service metadata 144, the defined behavioral categories 146, and some or all of the business rules 148 applied in using the summarized data delivered by the behavioral engine. Content metadata 142 may include, for example, basic product information such as title, price, description, product type, license options, handset compatibility, file size, etc. Service metadata 144 may include, for example, similar basic attributes on the data service side (e.g., channel definitions and corresponding identifiers/URLs for mobile TV service) for data services such as picture mail, mobile TV, messaging, mobile web browsing).

The subscriber data repository 104 may still further include aggregation and reporting data, such as summarized historical data 150, trends 152, and reports 154 which may be displayed in a computer or printed out, in textual or graphical format. The aggregation and reporting data may summarize the raw detailed records through processing in the behavioral engine such that once raw detailed records age past a certain point in time, the raw detailed records may be discarded, and useable summaries may be maintained for time periods in the past.

The business unit project engines 106 may access the subscriber data repository 104 to apply business rules using the data parsed according to common categories, though different business units may use different business rules in different ways to arrive at different conclusions and purposes. For example, one business unit focused on improving percentage of subscriber utilization of certain features or technologies offered may use the same raw detailed data, categorized according to the same categories, with a unique business rule to generate statistics used in improving subscriber utilization of a new service, while a marketing and advertising team may use the same raw data, categorized according to the same categories, with another unique business rule to generate targeted advertising campaigns.

Figure 2:
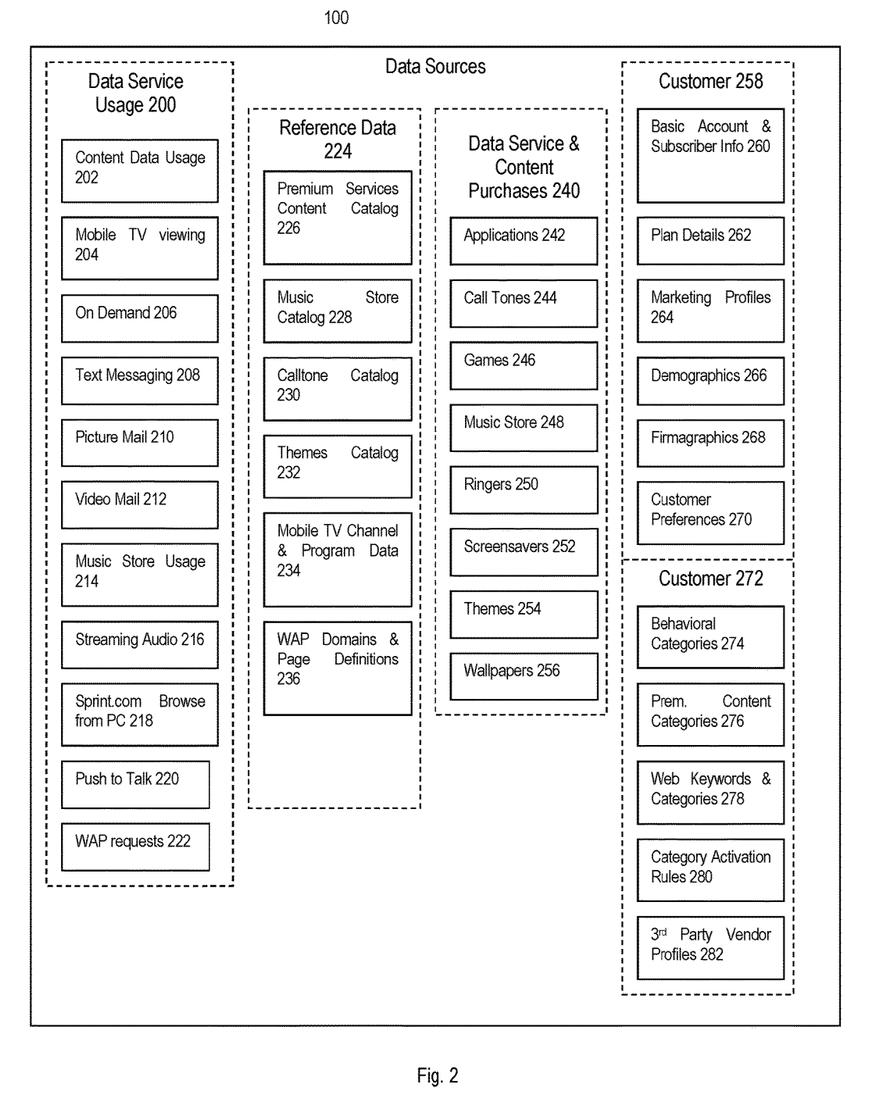
FIG. 2 is a block diagram of illustrative data sources used in conjunction with a behavioral engine in accordance with embodiments of the present disclosure.

Referring to FIG. 2, a block diagram of various illustrative data sources in the carrier system that feed data records into the behavioral engine of the present disclosure. The data sources may include data service usage data source 200, reference data source 224, data service & content purchases data source 240, subscriber reference data source 258, and subscriber profile data source 272. The various data sources 100 may reside in a single electronic repository or any combination of multiple repositories. The data sources 100 may include data sources for the carrier enterprise as well as any subsidiary company data sources and legacy sources of data that remain after business changes such as mergers.

The data sources 100 include data about how subscribers use their mobile devices, specifics about individual subscribers, and reference data. Specifically, the data service usage data source 200 includes data records pertaining to how subscribers use their mobile devices. The data service usage data source 200 may include records generated by activities undertaken by the subscriber either on the mobile device or in some cases the Internet. The activities may be, for example, content data usage 202 (e.g., the amount of network resources consumed in delivering content to a customer including time elapsed, KB of bandwidth used, etc.), mobile TV viewing 204 done on the mobile device, on demand 206 (e.g., a customized "newsreader" application with user-selected types and/or sources of news), text messaging 208, picture mail 210, video mail 212, music store usage 214 where electronic versions of music may be purchased, streaming audio 216 of music or talk shows, browsing the carrier's web page from a personal computer by logging in, push to talk 220, and/or WAP requests 222 from the mobile device.

Specifically, the data service and content purchases data source 240 includes data records pertaining to purchases made by subscribers from their mobile device. The data service and content purchases data source 240 may include records generated by purchases made by the subscriber either on the mobile device, or in some cases the Internet. The activities may be, for example, the purchase of applications 242, call tones 244, games 246, music files from a music store 248, ringers 250, screen savers 252, themes 254, and/or wallpapers 256, any of which may be used by the subscriber's mobile device.

Specifically, the reference data source 224 includes data records that are used to define associations and categories used in categorization by the behavioral engine as disclosed herein. For example, for the various types of premium content purchases, a catalog may list the items that may be purchased, an item identifier for each item, and the categories associated for each item. The reference data sources 224 may additionally define a hierarchy within the catalogs. For example, a ringer may be comprised of a song that is a fight song for a university team. In the catalog of ringers, that particular ringer may fall into a hierarchy where Music is the highest level, the next level is Theme Songs, and the next level is Sports Teams, and the lowest level is University Sports. At each level, a category may be associated with the ringer, such that when a subscriber purchases the ringer, the category for all of the levels, some of the levels, or just the lowest level may be associated with the subscriber's profile.

The reference data source 224 may include, for example, a premium services content catalog 226, a music store catalog 228, a call tone catalog 230, a themes catalog 232, a mobile TV channel and program data catalog 234, and a WAP domains & page definitions catalog 236. Each of the catalogs maps the items in the catalog to the same categories used when categorizing other types of behaviors, such as mobile web requests.

Specifically, the subscriber reference data source 258 includes data records that maintain carrier data pertaining to subscribers other than the behavioral data processed by the behavioral engine. The subscriber reference data source 258 includes data records such as basic account and subscriber information 260, subscriber plan details 262 (e.g. number of minutes per month, etc.), marketing profile 264 (e.g. subscriber provided demographics used for marketing), demographics 266 (i.e., an individual's traits), firmographics 268 (i.e., a company's traits such as size, industry focus, # of employees, location, etc.), and subscriber preferences 270.

Specifically, the subscriber profile data source 272 includes data records that define categories and rules for use by the behavioral engine as disclosed herein. The subscriber profile data source 272 may include behavioral categories 274 based on usage records, premium content categories 276, web keywords and categories 278 used for mobile web requests, category activation rules 280, and third party vendor profiles 282. Third party vendor profiles may consist of pre-mapped categories associated with premium content that is available from the third party vendor; such third party vendor profiles enable the categories of the present disclosure to be aligned with the categorization of items that has already been done by the third party vendors.

Figure 3:
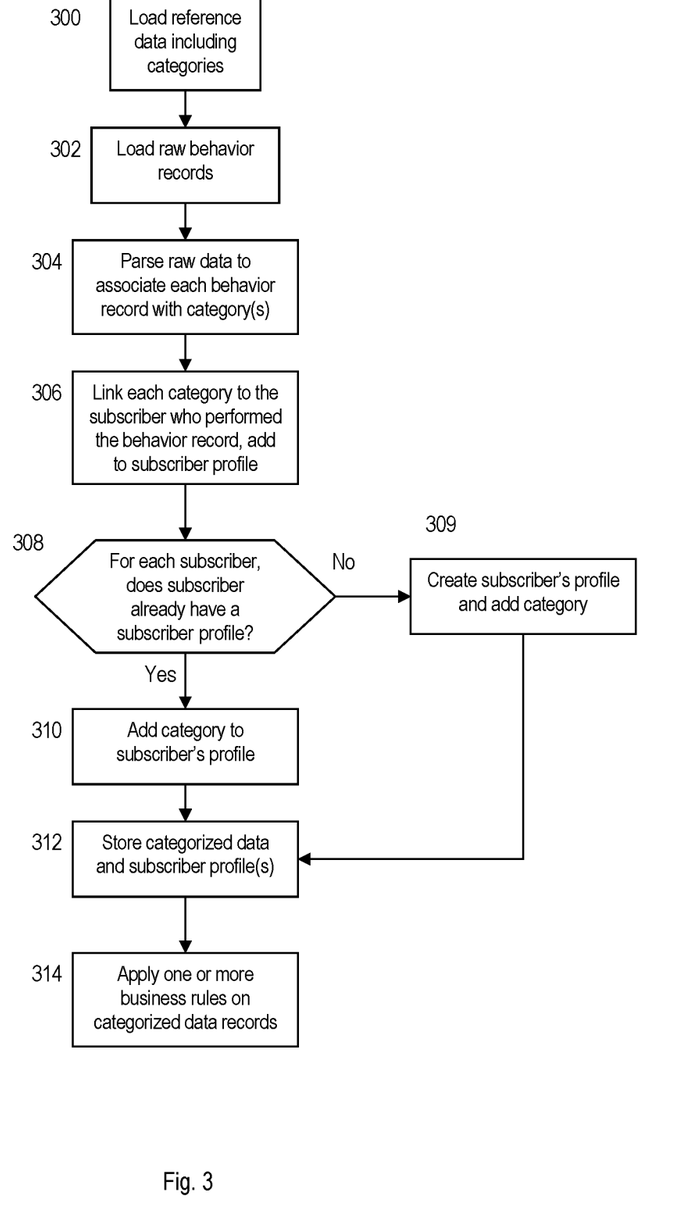
FIG. 3 is a flowchart illustrating a method for categorizing a plurality of types of data according to a common set of categories by a behavioral engine in accordance with embodiments of the present disclosure.

Referring to FIG. 3, the behavioral analysis engine processes and summarizes raw data into useable categories according to a process, one embodiment of which follows.

At 300, reference data is assembled and loaded into the system. The reference data includes, but is not limited to, the definitions of various behavioral categories, a behavioral category hierarchy, various premium content catalog product information, definitions of various premium content categories, various behavioral keyword/category associations. The load into the system may comprise either a push (i.e., data is automatically delivered into the system at prescribed intervals or based on some event that occurs) or a pull (i.e., the system specifically "asks" for the data).

At 302, raw behavioral data records are collected from various system data sources and loaded into the engine. The raw behavioral data records may include, for example, mobile web request logs and premium content download transaction records. Each record specifies a data usage activity performed by an individual subscriber (e.g., a mobile web request, a ringer purchase, a refund for a mobile screensaver). This data load may occur one time (transferring a vast amount of data accumulated) or may be repeated routinely on an ongoing, periodic basis.

At 304, the raw data usage records are parsed and each behavioral data record is associated with at least one category. Regardless of the type of the behavioral data record, the activities point to the same set of categories. For example, an Alicia Keys ringer purchase or a visit to www.aliciakeys.com would both be categorized according to the Alicia Keys, R&B Music, and Music categories.

The categories associated with behavioral data record are then applied to the subscriber who carried out the activity at 306. The category may be a new association for the subscriber, or an update to an existing association. At 308, the behavioral engine determines whether the subscriber already has a subscriber profile of categories. If not, at 309, the behavioral engine creates a subscriber profile for the subscriber with the category. If the subscriber does already have a subscriber profile, at 310, the behavioral engine adds or updates the category in the subscriber profile. The subscriber profile may include a granular level of detail relating to the subscriber's behaviors, including what is the most recent activity, what the subscriber used or purchased and how, where the subscriber has been on the Internet, how often the subscriber does these activities, and more.

At 312, the system summarizes and stores information about the subscriber-category pairing, i.e., the subscriber profile, as well as the categorization generally for use in the aggregate. In this fashion, the subscriber's behavior maybe tracked by date, by content type (ringer, web, etc.), behavioral category (news, sports, etc.), and various combinations of the same. The summarized data provides a common, low-level base of information about the subscriber's activities in a particular behavioral category over time.

At 314, business rules are then executed on the summarized data in the aggregate to determine specific items of interest about specific subscribers or groups of subscribers. For example, a business rule may be operable to determine whether a particular subscriber should be considered "active" or "inactive" for a particular category. The business rules may combine a variety of criteria based on total or average activity counts over time, how recent an activity occurred, activities by content type, etc.

Another illustrative business rule might be that a subscriber is active for the 'Finance & Money' category if they have had 14+ total mobile web requests in that category over the last 7 days. Another illustrative business rule might be that a subscriber is active for the Music category if they have 2+ ringer purchases in the last 4 calendar weeks or 30+ total Music-related web requests in the last 3 calendar months. Using categories and business rules in this fashion permits different types of activities to be weighted differently (e.g., a ringer purchase may be considered by the business to be more valuable and precise than a web request). Using categories and business rules also allows a subscriber to be automatically deactivated from a category if their activities in that area drop off.

Different groups such as business units within the carrier enterprise may have their own sets of business rules and associated activation flags for each subscriber-category association. Using the same subscriber-category associations and categories allows the same underlying data and low-level categorization tracking to be leveraged for different purposes by different teams.

Figure 4:
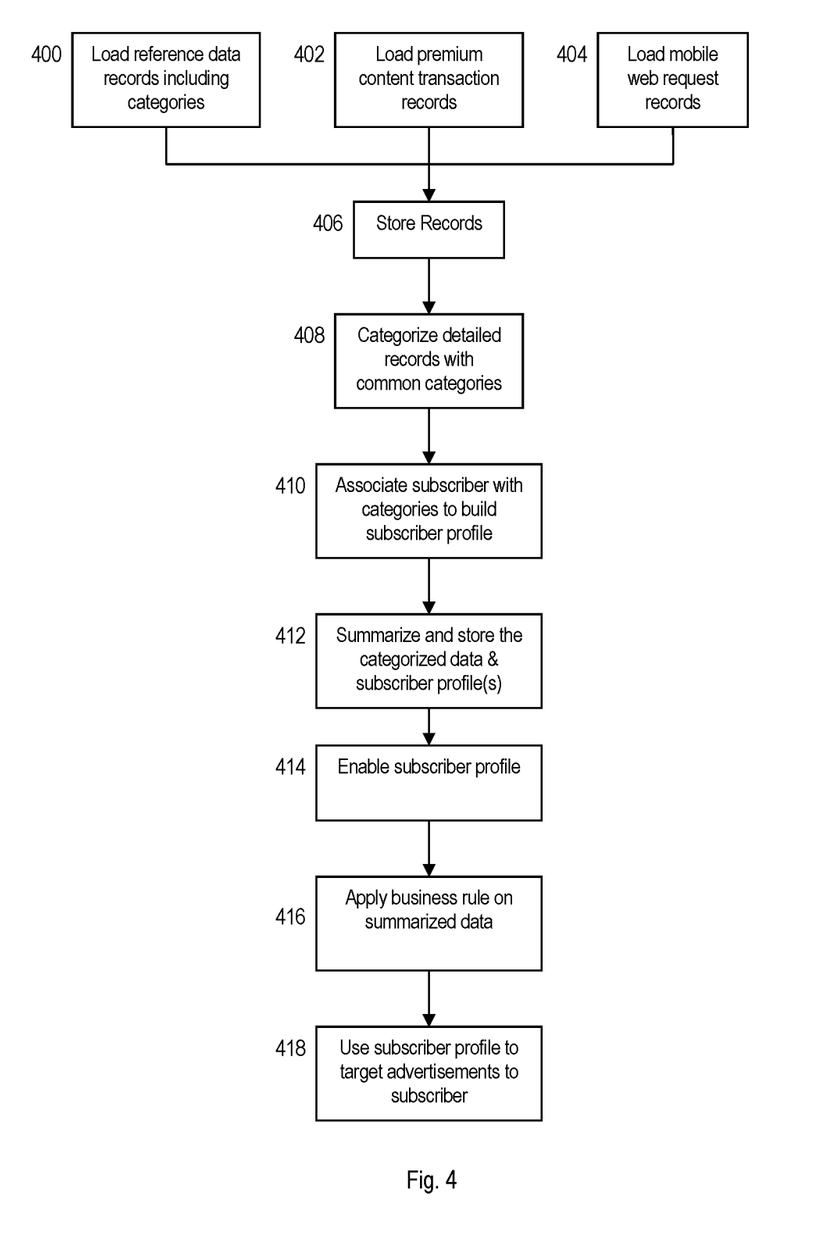
FIG. 4 is a flowchart of one example for categorizing premium content purchases and mobile web requests according to a common set of categories by a behavioral engine in accordance with embodiments of the present disclosure.

Referring to FIG. 4, a flowchart is shown for an alternative illustrative embodiment of the disclosed method. In this example, different types of detailed data records are categorized according to the same categories to build subscriber profiles that may be used in targeting advertisements more effectively to subscribers.

At 400, reference data is assembled and loaded into the system. The reference data includes, but is not limited to, the definitions of various behavioral categories, a behavioral category hierarchy, various premium content catalog product information, definitions of various premium content categories, various behavioral keyword/category associations. The keyword/category associations may be defined according to any logic deemed relevant by the programmer when loaded. At 402, detailed premium content transaction records (including, for example, date and time of a purchase, the identity of the premium content purchased, the subscriber who purchased the content and the like) are loaded into the system. At 404, detailed mobile web request records (including, for example, date and time of a mobile web request, the identity of a site or content requested in the mobile request, the subscriber who made the request, and the like) are loaded into the system.

400, 402 and 404 may occur simultaneously, or in any order, however in order to further carry out the illustrative example, the reference data and at least some premium content transaction records and some mobile web request records are necessary in the system. When the reference data are changed, updated, or added to, the reference data may be reloaded periodically to reflect the changes, updates, and additions. Likewise, as time passes and additional premium content transactions and mobile web requests occur, the new detailed records may be loaded, either in real-time as they occur, or periodically.

At 406, the detailed records of the various types are stored in the system. At 408, the behavioral engine categorizes the detailed records according to a common set of categories. Specifically, in the case of the detailed records for mobile web requests, the behavioral engine takes a keyword-driven approach to perform an association between a mobile web request data record and a category (e.g., "espn.com=Sports category"). The behavioral engine identifies and extracts programmed keywords in the requested URL for the mobile web request. Having identified the keyword(s), the behavioral engine performs a lookup to determine which category or categories are associated with the identified keyword(s).

In the case of premium content downloads, the behavioral engine extracts a product identifier from the premium content transaction record, and performs a lookup in a premium content catalog (also loaded at 400) based on the content item's product identifier to determine which behavioral categories have been associated with that item.

Having applying the common set of categories to the different types of data records, the at 410 the behavioral engine associates the subscriber who made the mobile request or premium content purchase with the identified category or categories to build a subscriber profile. The subscriber profile thereby establishes accurate data pertaining to the individual subscriber based on the subscriber's actual unique interests and the manner in which the subscriber uses his or her mobile device, rather than mere demographics.

At 412, the behavioral engine summarizes and stores the categorized data and subscriber profiles. By maintaining a categorized, summarized version of the vast amounts of data available to the carrier, the behavioral engine makes otherwise overwhelming amounts of data into useable summarized pieces. Additionally, by applying a common set of categories across the enterprise, the same underlying data may be used and reused for different purposes, such as subscriber service and retention, marketing, personalizing subscriber devices, and more.

At 414, the subscriber profile(s) is enabled for use, such that business units may access the behavioral engine and the subscriber profiles to use subscriber specific information for various business purposes.

At 416, a business unit, such as the business unit in the carrier charged with targeting advertisements to subscribers on the mobile devices, applies the business rule or set of business rules used by the business unit to the categorized, summarized data. The business rule may be, in this case, a rule to identify groups of subscribers according to interest in sports or music, such that the subscribers may be targeted with advertisements aimed at their interests in sports or music.

At 418, the business unit uses the subscriber profiles identified in applying the business rule, targeting advertisements to the subscribers identified by categories intended to be reached by a marketing campaign. Likewise, based on subscriber profiles thus generated, another business unit utilizing the same categorized data would be enabled to make download recommendations to subscribers based on their previous usage and content purchases.

Figure 5:
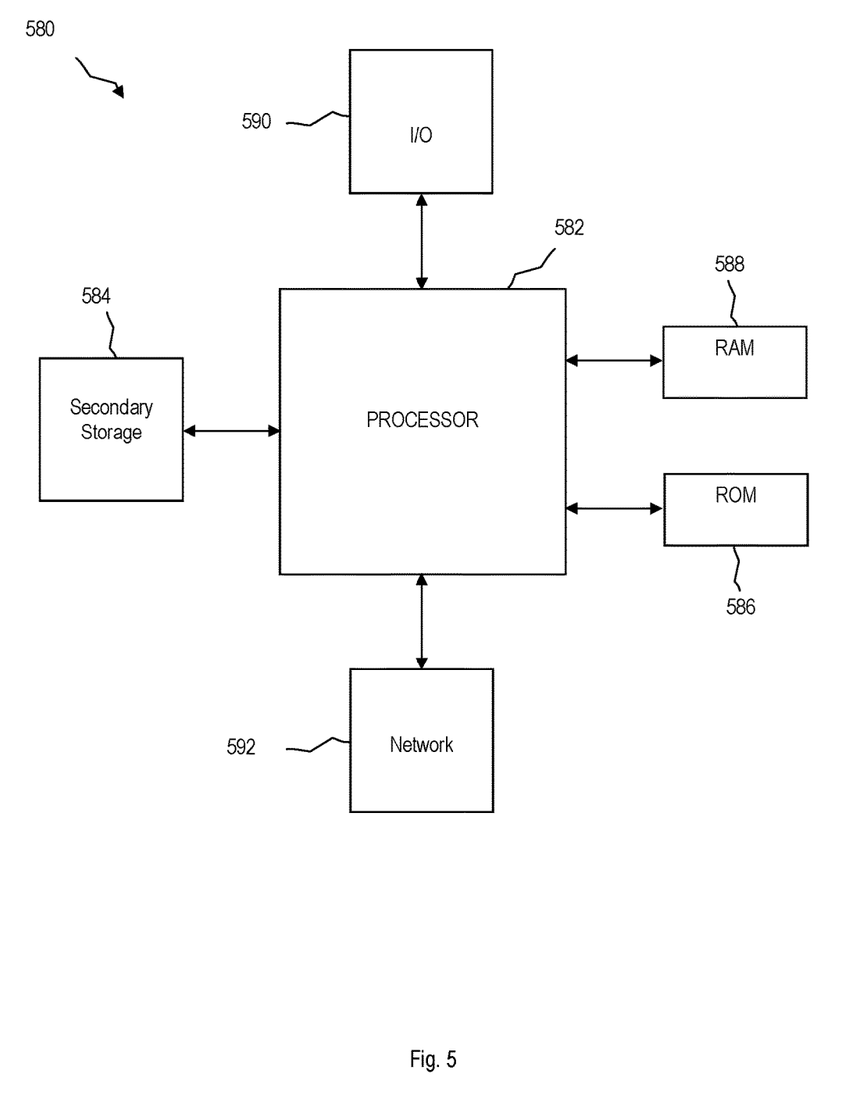
FIG. 5 is a general purpose computer that, according to various embodiments, may be used to implement the present disclosure.

The present disclosure may be implemented, at least partially, on a server or on any general-purpose computer(s) with sufficient processing power, memory resources, and network throughput capability to handle the necessary workload placed upon it. FIG. 8 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, reads only memory (ROM) 586, random access memory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are reads during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein. Although the present invention and its advantages have been described in detail, various changes, substitutions and alterations may be made herein without departing from the spirit and scope of the invention as defined by the appended claims.

What is claimed is:

1. A computer-implemented method of collecting, processing, and analyzing subscriber data, comprising:

loading, from a reference data source to a behavioral engine stored in a non-transitory memory and executed by at least one processor of a server at a carrier network provider, carrier reference data comprising definitions of a plurality of behavioral categories, a premium content catalog, and definitions of a plurality of premium content categories;

monitoring and tracking, at a plurality of different data sources, mobile device activities of a plurality of subscribers associated with a plurality of mobile devices via generation of a plurality of raw data records, wherein the mobile device activities that generate the plurality of raw data records comprise:

at least one of a text message, a mobile picture mail, or a mobile video mail, content purchased from a content store by the plurality of subscribers using the plurality of mobile devices, when and how the content purchased by each subscriber of the plurality of subscribers is used by the subscriber on a mobile device of the plurality of mobile devices, and mobile web requests for Wireless Application Protocol (WAP) pages from the plurality of mobile devices;

processing and parsing, by the behavioral engine, the plurality of raw data records generated according to the mobile device activities to identify content associated with the plurality of raw data records based on the carrier reference data;

determining, by the behavioral engine, for each raw data record of the plurality of raw data records generated according to the mobile device activities, a category of a plurality of categories that is associated with the identified content of the raw data record based on the carrier reference data;

building, by the behavioral engine, a subscriber profile of a plurality of subscriber profiles for each subscriber of the plurality of subscribers and compiling each determined category associated with each raw data record of the plurality of raw data records generated according to the mobile device activities based on behavior of the subscriber into the subscriber profile for the subscriber;

identifying, by the behavioral engine, a subset of subscriber profiles associated with a subset of subscribers from the plurality of subscribers by applying one or more business rules to the plurality of subscriber profiles; and identifying, by a computer, an advertisement to provide to one of the plurality of mobile devices based on at least one subscriber profile associated with at least one subscriber selected from the subset of subscribers by applying one or more business rules to the at least one subscriber profile.

2. The method of claim 1, further comprising generating a categorized data record of a plurality of categorized data records for each raw data record of the plurality of raw data records by associating, by the behavioral engine, the determined category of the plurality of categories with the raw data record.

3. The method of claim 2, further comprising:
storing each subscriber profile built by the behavioral engine in a non-transitory memory of a subscriber data repository communicatively coupled to the server at the carrier network provider; and
discarding, by a computer, the plurality of raw data records after generation of the plurality of categorized data records.

4. The method of claim 1, wherein the carrier reference data further comprises a behavioral category hierarchy, and wherein the plurality of raw data records comprises premium content download transaction records.

5. The method of claim 1, wherein the premium content catalog comprises a list of a plurality of items available for purchase, an item identifier for each of the plurality of items available for purchase, and a category of the plurality of premium content categories associated with each of the plurality of items available for purchase.

6. The method of claim 1, wherein the content purchased comprises at least one of a song, a mobile device application, a mobile device screensaver, a mobile device call tone, a mobile device game, a mobile device ringer, a mobile device theme, or a mobile device wallpaper.

7. The method of claim 1, wherein at least some of the mobile device activities are monitored and tracked on the plurality of mobile devices by a data service usage data source.

8. The method of claim 7, wherein the plurality of different data sources comprises the data service usage data source, a data service and content purchases data source, and a WAP request data source.

9. The method of claim 1, wherein each raw data record generated based on the content purchased from the content store comprises an identity of the content and purchase price, each raw data record generated based on when and how the content purchased is used by the subscriber on their mobile device comprises at least two of a storage location of the content purchased, amount of network resources consumed in delivering the content purchased, time of usage, or configuration settings, and each raw data record generated based on the mobile web requests for WAP pages comprises a WAP address and one or more web keywords.

10. The method of claim 1, further comprising sending a download recommendation to one of the plurality of mobile devices associated with one of the plurality of subscribers based on a subscriber profile associated with the one of the plurality of subscriber profiles.

11. A carrier system for collecting, processing, and analyzing subscriber data, comprising:
a plurality of different data sources that monitor and track mobile device activities of a plurality of subscribers associated with a plurality of mobile devices via generation of a plurality of raw data records, wherein the mobile device activities that generate the plurality of raw data records comprise:
at least one of a text message, a mobile picture mail, or a mobile video mail,
content purchased from a content store by the plurality of subscribers using the plurality of mobile devices,
when and how the content purchased by each subscriber of the plurality of subscribers is used by the subscriber on a mobile device of the plurality of mobile devices, and
mobile web requests for Wireless Application Protocol (WAP) pages from the plurality of mobile devices; and
a server at a carrier network provider that is communicatively coupled to each of the plurality of different data sources via a network of the carrier network provider, the server comprising one or more processors and a behavioral engine stored in a non-transitory memory, that upon execution by at least one processor, configures the at least one processor to:
obtain, from a reference data source, carrier reference data comprising definitions of a plurality of behavioral categories, a premium content catalog, and definitions of a plurality of premium content categories,
process and parse the plurality of raw data records generated according to the mobile device activities to identify content associated with the plurality of raw data records based on carrier reference data,
determine, for each raw data record of the plurality of raw data records generated according to the mobile device activities, a category of a plurality of categories that is associated with the identified content of the raw data record based on the carrier reference data,
build a subscriber profile of a plurality of subscriber profiles for each subscriber of the plurality of subscribers and compiling each determined category associated with each raw data record of the plurality of raw data records generated according to the mobile device activities based on behavior of the subscriber into the subscriber profile for the subscriber,
identify a subset of subscriber profiles associated with a subset of subscribers from the plurality of subscribers by applying one or more business rules to the plurality of subscriber profiles, and
identify an advertisement to provide to one of the plurality of mobile devices based on at least one subscriber profile associated with at least one subscriber selected from the subset of subscribers by applying one or more business rules to the at least one subscriber profile.

12. The carrier system of claim 11, wherein the behavioral engine further:
generates a categorized data record of a plurality of categorized data records for each raw data record of the plurality of raw data records by associating the determined category of the plurality of categories with the raw data record, and discards the plurality of raw data records once the plurality of categorized data records is generated.

13. The carrier system of claim 12, further comprising a subscriber data repository that stores, in a non-transitory memory, the plurality of categorized data records in an aggregate level and each subscriber profile built by the behavioral engine at an individual level.

14. The carrier system of claim 13, further comprising a plurality of business unit project engines that configure a processor of the server to access the subscriber data repository to apply business rules to the plurality of categorized data records, wherein each business rule for each business unit project engine is unique to a project carried out by a particular group within an enterprise of the carrier network provider.

15. The carrier system of claim 14, wherein a business rule applied to the plurality of categorized data records configures the processor to determine, at an individual level, that a particular subscriber should be selected as a target subscriber for the project by determining that the particular subscriber is active for one of the plurality of categories based on a threshold comprising an activation flag.

16. The carrier system of claim 14, wherein a business rule applied to the plurality of categorized data records configures the processor of the server to determine, at an aggregate level, that a particular grouping of subscribers should be selected for targeting for the project by determining that the particular grouping of subscribers is active for one of the plurality of categories based on a threshold that comprises activation flags.

17. The carrier system of claim 11, wherein at least some of the mobile device activities are monitored and tracked on the plurality of mobile devices by a data service usage data source.

18. The carrier system of claim 17, wherein the plurality of different data sources comprises the data service usage data source, a data service and content purchases data source, and a WAP request data source.

19. A computer-implemented method of collecting, processing, and analyzing subscriber data, comprising:
   loading, from a reference data source to a behavioral engine stored in a non-transitory memory and executed by at least one processor of a server at a carrier network provider, carrier reference data comprising definitions of a plurality of behavioral categories, a premium content catalog, and definitions of a plurality of premium content categories;
   monitoring and tracking, at a plurality of different data sources, mobile device activities of a plurality of subscribers associated with a plurality of mobile devices via generation of a plurality of raw data records, wherein the mobile device activities that generate the plurality of raw data records comprise:
      at least one of a text message, a mobile picture mail, or a mobile video mail,
      content purchased from a content store by the plurality of subscribers using the plurality of mobile devices,
      when and how the content purchased by each subscriber of the plurality of subscribers is used by the subscriber on a mobile device of the plurality of mobile devices, and
      mobile web requests for Wireless Application Protocol (WAP) pages from the plurality of mobile devices;
   processing and parsing, by the behavioral engine, the plurality of raw data records generated according to the mobile device activities to identify content associated with plurality of raw data records based on the carrier reference data;
   determining, by the behavioral engine, for each raw data record of the plurality of raw data records generated according to the mobile device activities, a category of a plurality of categories that is associated with the identified content of the raw data record based on the carrier reference data;
   building, by the behavioral engine, a subscriber profile of a plurality of subscriber profiles for each subscriber of the plurality of subscribers and compiling each determined category associated with each raw data record of the plurality of raw data records generated according to the mobile device activities based on behavior of the subscriber into the subscriber profile for the subscriber;
   identifying, by the behavioral engine, a subset of subscriber profiles associated with a subset of subscribers from the plurality of subscribers by applying a first business rule selected by a first business group of the carrier network provider to the plurality of subscriber profiles, wherein the first business rule applied by the behavioral engine determines that each subscriber in the subset of subscribers is active in at least one category of the plurality of categories by applying different weights to at least some of the types of mobile device activities of the subscriber; and
   identifying, by a computer, an advertisement to provide to at least one of the plurality of mobile devices based on at least one subscriber profile associated with at least one subscriber selected from the subset of subscribers by applying a second business rule selected by a second business group of the carrier network provider to the at least one subscriber profile.

20. The method of claim 19, wherein a mobile device activity of a ringer purchase by the subscriber in the at least one category is weighted more heavily than a mobile device activity of a WAP request by the subscriber in the at least one category in determining whether the subscriber is active in the at least one category.

* * * * *